(12) United States Patent  
Cravener et al.

(10) Patent No.: US 8,444,112 B2
(45) Date of Patent: May 21, 2013

(54) LOCKING Y-VALVE

(76) Inventors: Michael Cravener, Chandler, AZ (US); Tom Conner, Mesa, AZ (US)

(*) Notice: Subject to any disclaimer, the term of this patent is extended or adjusted under 35 U.S.C. 154(b) by 311 days.

(21) Appl. No.: 12/908,612

(22) Filed: Oct. 20, 2010

(65) Prior Publication Data

US 2011/0089356 A1   Apr. 21, 2011

Related U.S. Application Data

(60) Provisional application No. 61/253,427, filed on Oct. 20, 2009.

(51) Int. Cl.
 *F16K 31/00* (2006.01)
 *F16K 35/00* (2006.01)

(52) U.S. Cl.
 USPC ............... 251/95; 251/98; 251/99; 251/291; 251/292; 251/293; 137/385

(58) Field of Classification Search
 USPC ............... 251/95, 96, 98, 99, 291, 292, 293
 See application file for complete search history.

(56) References Cited

U.S. PATENT DOCUMENTS

| 4,909,275 | A | * | 3/1990 | Massey et al. | 137/385 |
| 5,213,308 | A | * | 5/1993 | Jeromson et al. | 251/95 |
| 5,598,724 | A | * | 2/1997 | Primeau | 70/177 |

* cited by examiner

*Primary Examiner* — John K Fristoe, Jr.
*Assistant Examiner* — Kevin Barss
(74) *Attorney, Agent, or Firm* — Etherton Law Group, LLC; Benjamin D. Tietgen

(57) ABSTRACT

A locking Y-valve has branches that can be independently locked open or locked closed. Each branch has a ball valve connected to a rotating valve column. The valve column extends through a lock plate and attaches to a housing that contains a locking mechanism. The locking mechanism has a retractable lock pin that cooperates with two recesses in the lock plate to keep the housing, valve column, and ball valve locked in place. The locking mechanism is attached to a rotatable handle outside the housing. Rotating the handle retracts the lock pin from a recess so that the handle can be moved. Releasing the handle extends the lock pin into a recess, securing the handle in place. One or more of the lock plate and housing may be integral with the Y-valve. In the preferred embodiment, the lock plate is configured to be retrofit onto existing Y-valves, so that a non-lockable Y-valve may be converted into a lockable Y-valve.

17 Claims, 11 Drawing Sheets

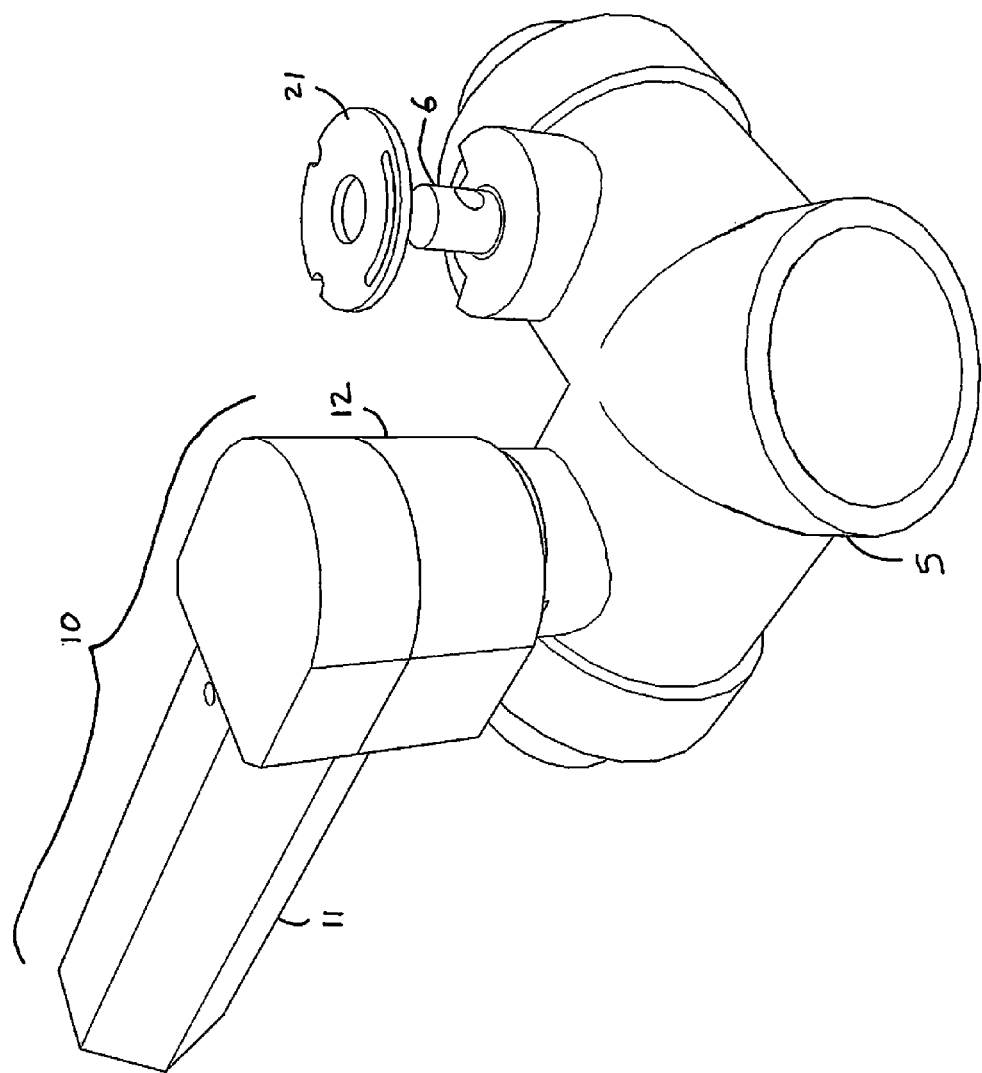

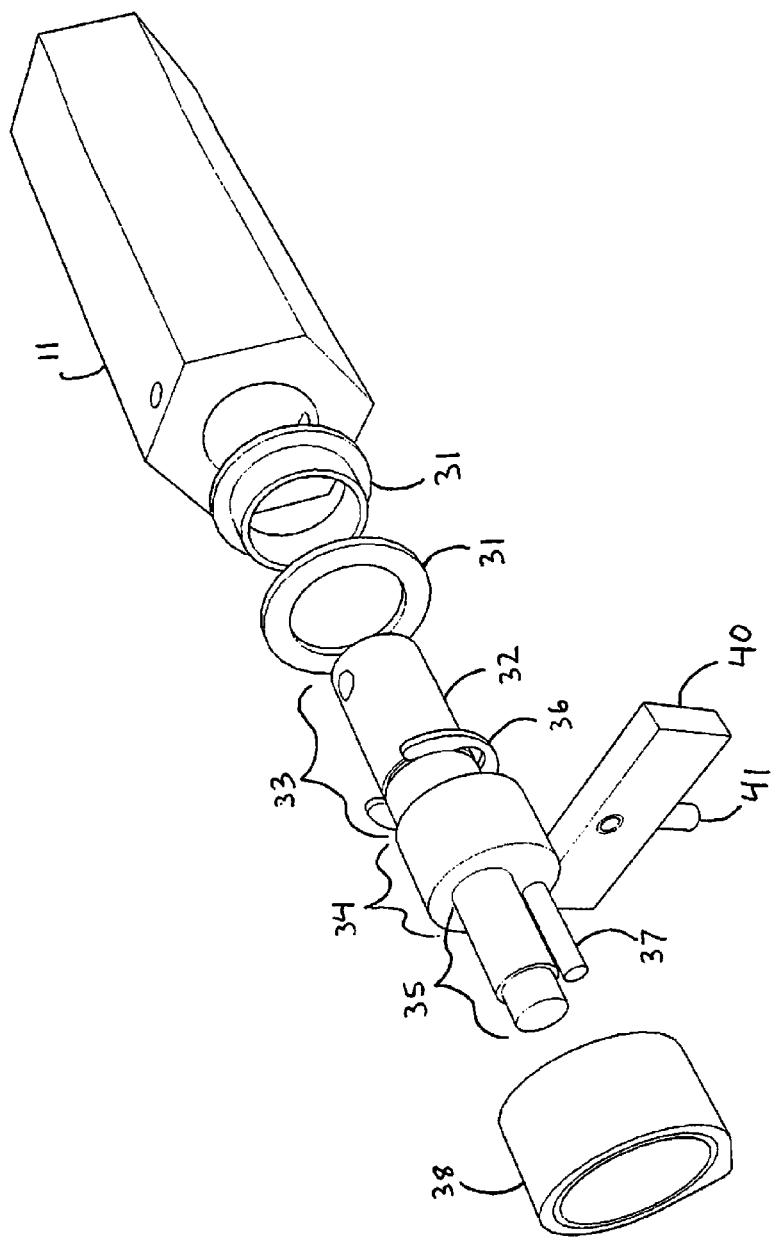
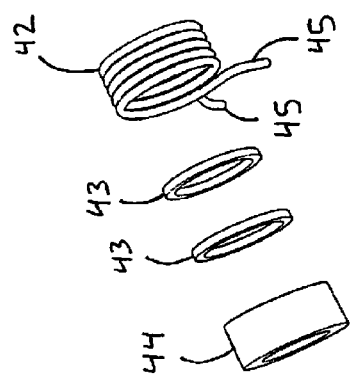
FIG. 7

LOCKING Y-VALVE

CROSS-REFERENCE TO RELATED APPLICATIONS

This application is a non-provisional application and claims the benefit of U.S. Provisional Pat. App. Ser. No. 61/253,427, filed Oct. 20, 2009.

FIELD OF INVENTION

This invention relates to fluid valves. This invention relates particularly to a mechanism for enabling the branches of a Y-valve to be locked on or off.

BACKGROUND

To extinguish a fire, firefighters spray water from a water source through a hose. The water sources are often fire trucks, known as pumpers, which pressurize water flowing from a fire hydrant so that the water has enough force to travel to the end of the hose and be sprayed on the fire. The hoses have couplings on each end that enable the hoses to be joined to other hoses, valves, or the water source. For example, if a hose is too short to reach a fire, hose extensions can be attached to each other with mated couplings. It is common to extend the length of a hose from a pumper by running a single larger diameter hose from the pumper towards the fire, mate the end of the hose to a Y-valve, and attach smaller diameter hose extensions to each branch of the Y-valve.

The discharge from each branch of the Y-valve is controlled independently, which affords firefighters the ability to control when and where the water is spraying. This is particularly important when the free end of the hose is being carried to the fire, because the pressure of the water being discharged is so great that if discharge happens unexpectedly, a firefighter can be knocked off balance or spray huge volumes of water where it isn't needed, thereby causing water damage unnecessarily.

Y-valves for such use are usually ball valves that are gated with handles that rotate around an axis perpendicular to the branch. The handles rotate freely from a closed position to an open position. Unfortunately, handles on known Y-valves do not lock in place, so as the hose is being carried to the desired location for fighting the fire, the valve handles can be knocked on the ground, doorways, or other objects that cause them to open unexpectedly. Conversely, bumping the valve handles around can also cause them to close unexpectedly. The sudden lack of water may allow the fire to engulf the firefighter or the structure. It would be advantageous to be able to keep the valves in their desired open or closed positions until turned on or off by a firefighter.

Of course, firefighters wear fire-resistant equipment when fighting a fire, including heavy gloves. These gloves make it difficult to make small, precise movements with one's fingers, however it is often necessary to turn the valves off and on quickly. Therefore, it would be advantageous to have a locking Y-valve that can be opened or closed easily while wearing firefighting equipment. And, such a locking valve system must be designed to withstand adrenaline-charged, strong hands and arms turning it on and off.

The design of existing Y-valves, particularly for firefighting, is reliable save for the lack of locking branches. Specifically, Y-valves are typically cast in heavy duty steel, and are sized and threaded according to accepted standards. Therefore, it would be advantageous to provide a mechanism that can be attached to the existing accepted Y-valve to convert it into a locking Y-valve with the above-described advantages.

Therefore, it is an object of this invention to provide a locking Y-valve. It is a further object of this invention to provide a locking Y-valve in which each branch can be independently locked opened or closed. It is another object to provide a locking Y-valve that can be unlocked and opened or closed easily with one hand, yet can be relied upon to remain in a locked open or closed position even in rough handling or inadvertent contact. It is another object to provide an assembly that can be retrofit onto existing Y-valves to convert them into locking Y-valves.

SUMMARY OF THE INVENTION

A locking Y-valve has two branches that can be independently locked open or locked closed. The liquid flow through each branch is controlled by a ball valve connected to a rotating valve column. The valve column extends through a lock plate and attaches to a housing that contains a locking mechanism. The locking mechanism has a retractable lock pin that cooperates with two recesses in the lock plate to keep the housing, valve column, and ball valve locked in place. The locking mechanism is attached to a rotatable handle outside the housing. The handle rotates under tension, retracting the lock pin from the first recess so that the handle can be moved. As the handle is released, the lock pin extends into the second recess, securing the handle in place. In the preferred embodiment, the handle is spring-loaded so that it automatically returns to a pin-down, locked position. Further in the preferred embodiment, the handle can be rotated either way to raise and lower the pin. One or more of the lock plate and housing may be integral with the Y-valve. In the preferred embodiment, the lock plate is configured to be retrofit onto existing Y-valves, so that a non-lockable Y-valve may be converted into a lockable Y-valve.

BRIEF DESCRIPTION OF THE DRAWINGS

FIG. 1A is a front top perspective view and FIG. 1B is a rear top perspective view of the locking Y-valve of the present invention.

FIG. 7 is an exploded top perspective view of the preferred locking mechanism.

DETAILED DESCRIPTION OF THE INVENTION

Figure 1A:
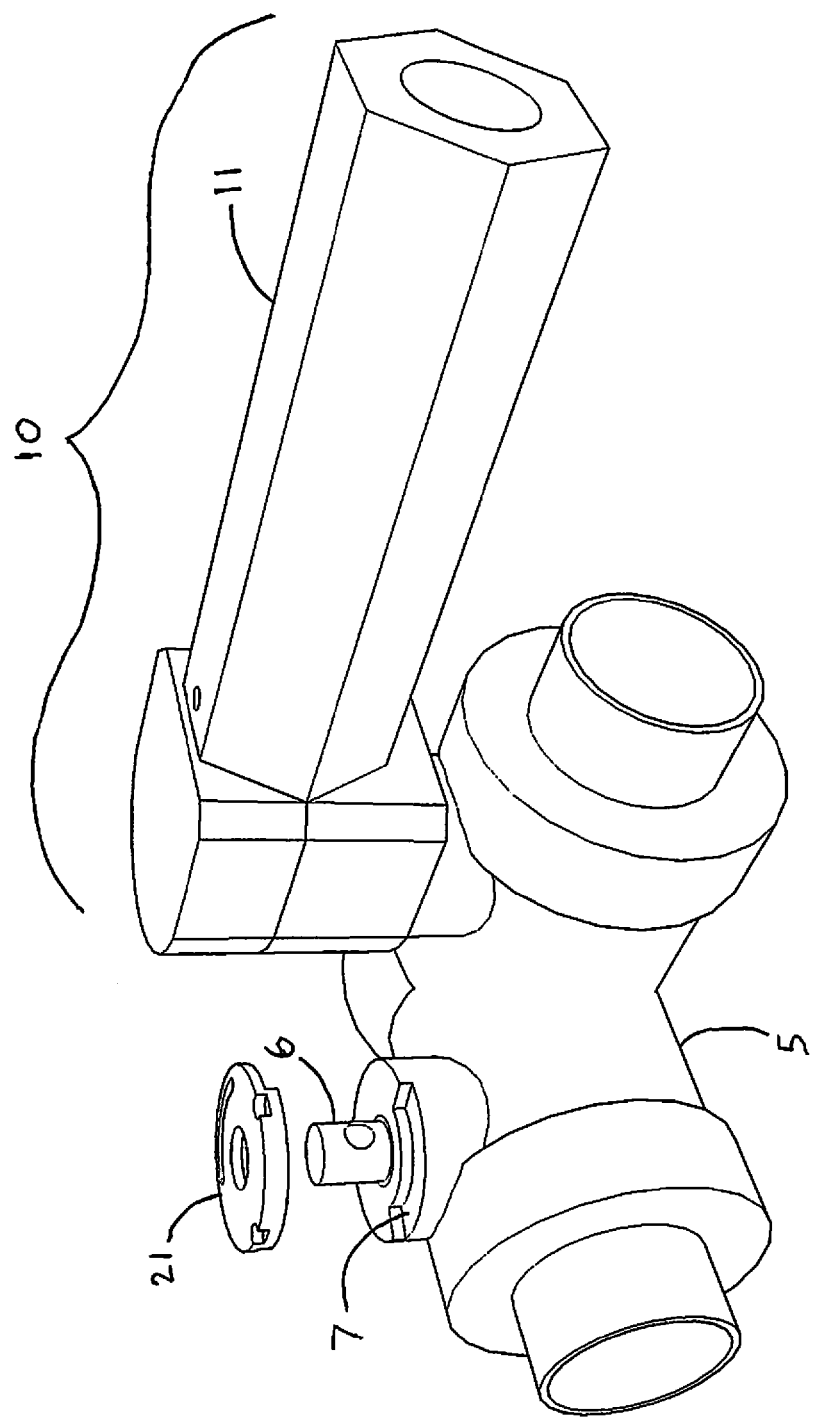
Figure 2:
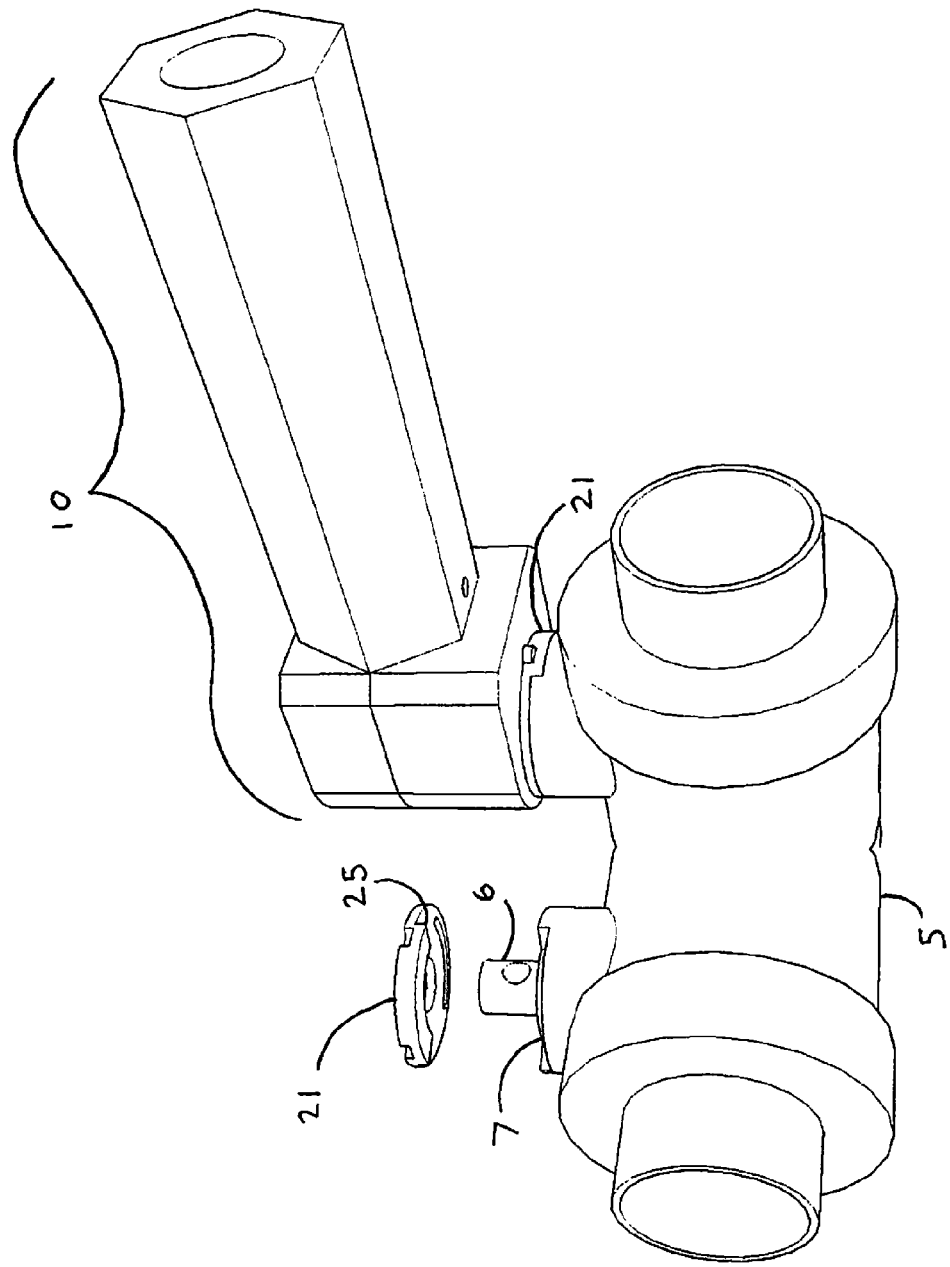
FIG. 2 is a front bottom perspective view of the locking Y-valve of the present invention.
Figure 3:
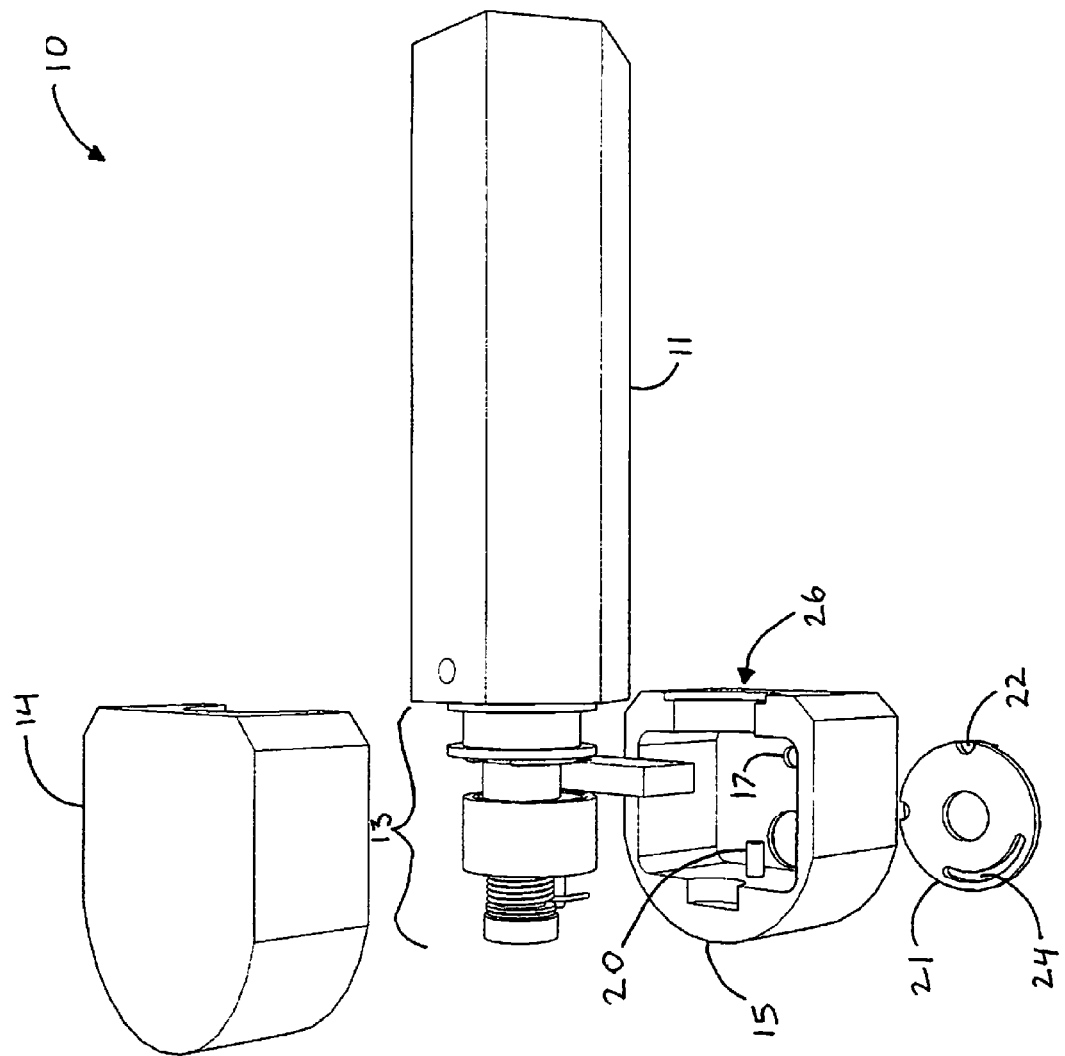
FIG. 3 is a top right perspective view of the locking handle assembly and lock plate, showing the housing open.
Figure 4:
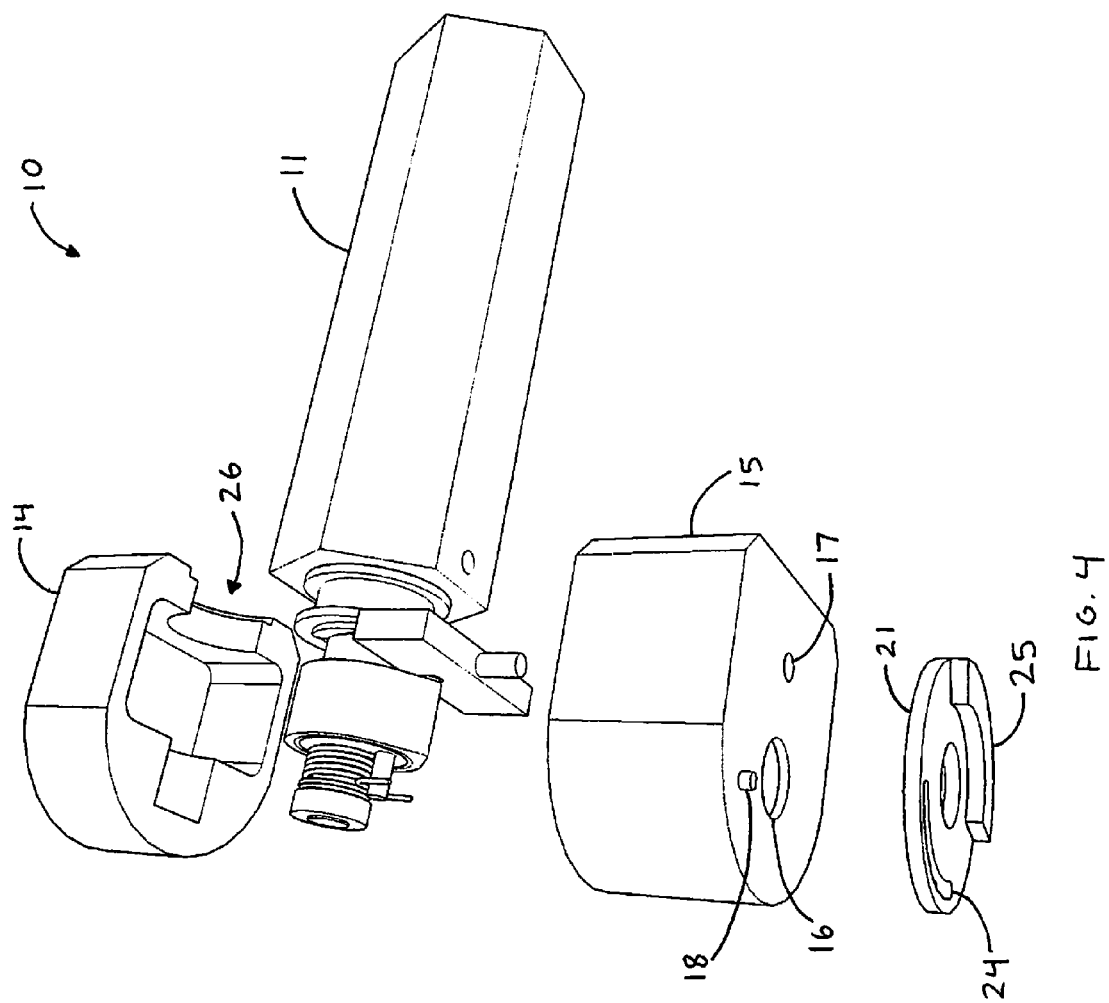
FIG. 4 is a bottom right perspective view of the locking handle assembly and lock plate, showing the housing open.
Figure 5:
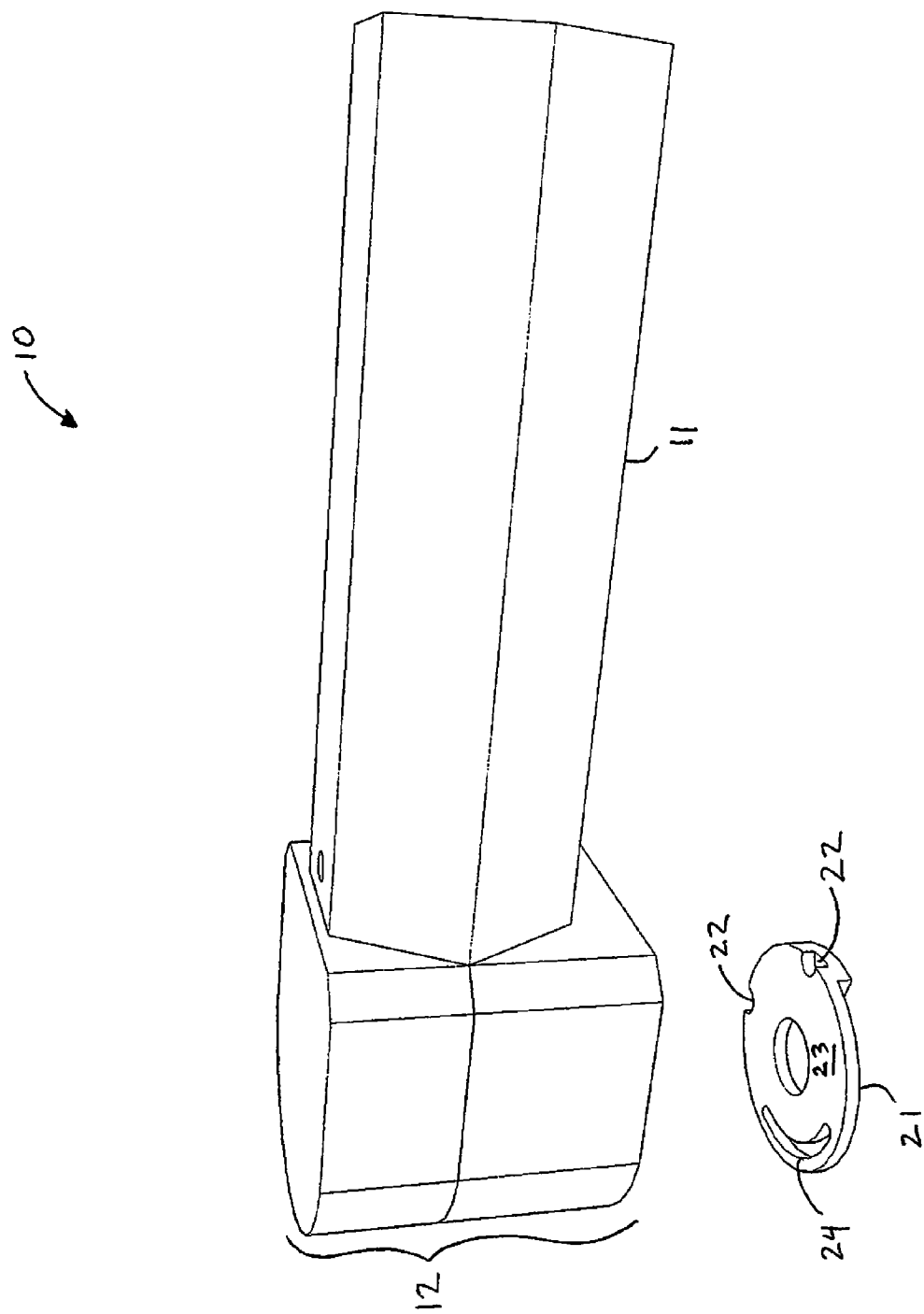
FIG. 5 is a front right perspective view of the assembled locking handle assembly and lock plate.
Figure 6:
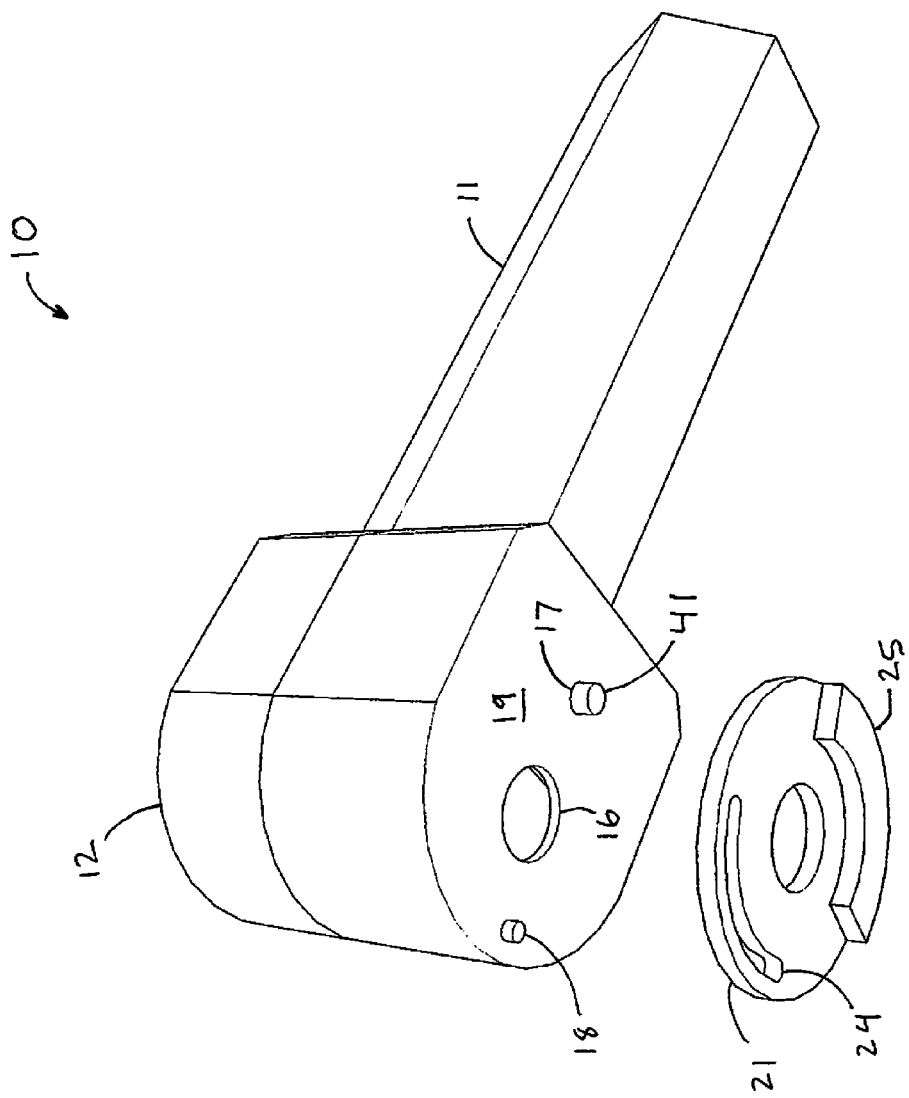
FIG. 6 is a bottom right perspective view of the assembled locking handle assembly and lock plate.

Referring to FIGS. 1A, 1B and 2, a Y-valve body 5 has two branches. The water flowing through the valve body is controlled by two ball valves (not shown), one inside each branch, as known in the art. Each ball valve is attached to a valve column 6 that rotates around its axis to open and close the ball valve. The locking handle assembly 10 of the present invention is attached to the valve column 6. The assembly 10 has a handle 11 that rotates around its own axis and around the axis of the valve column 6. When the assembly 10 is installed on the Y-valve, rotating the handle 11 about the valve column's 6 axis manipulates the ball valve. In the ball valve's closed position, the handle 11 is perpendicular to its branch of the Y; in the valve's open position, the handle is parallel to its branch of the Y as shown in FIGS. 1A and 2.

FIGS. 3-6 illustrate the components of the assembly 10. In addition to the handle 11, the assembly 10 also has a housing 12 that encases substantially all of a locking mechanism 13. The housing 12 is preferably machined aluminum, but may be another heavy-duty material such as steel or brass. The housing comprises an upper portion 14 and a lower portion 15 that fit together and are adhesively or non-adhesively attached to each other to enclose the locking mechanism 13. Preferably, the upper portion 14 and lower portion 15 are attached to each other by hex screws (not shown). An axle aperture 26 may be formed into one or both of the upper and lower portions 14, 15 at the proximal end to allow the axle 32 of the locking mechanism 13 to pass into the handle 11 as described below. Preferably, a portion of the axle aperture 26 is formed into each portion 14, 15 at the proximal end, so that the axle aperture 26 is completed when the two portions 14, 15 of the housing 12 are attached to each other. One or more mounting washers 31 are preferably disposed in the axle aperture 26 to create a smooth aperture after the portions 14, 15 are joined.

A column aperture 16 is disposed through the bottom of the lower portion 15 for receiving the valve column 6. To attach the assembly 10 to the valve column 6, an attachment device, such as a pin, may be inserted through the wall of the lower portion 15 and into the valve column 6. A pin aperture 17 is also disposed through the bottom of the lower portion 15 to receive the lock pin 41 described below. The lower portion 15 further may have a tab 18 that extends from the bottom surface 19 of the lower portion 15 and cooperates with the tab channel 24 to limit the range of rotation of the assembly 10 as described below. The lower portion 15 further may have a biasing post 20 that extends into the interior of the lower portion 15 from the distal end of the lower portion 15. The biasing post 20 is preferably cylindrical, substantially parallel to the main axis of the locking mechanism 13, and of a suitable length to cooperate with the locking mechanism 13 as described below. Preferably, the biasing post 20 is integral with the wall of the lower portion 15, but alternatively the biasing post 20 may be permanently or removably attached to the wall.

The bottom surface 19 of the lower portion 15 of the housing 12 abuts the top surface 23 of a lock plate 21. The lock plate 21 is circular, encircling and being substantially coaxial with the valve column 6. At least two recesses 22 are formed into the top surface 23 at the outer edge of the lock plate 21. The number of recesses 22 corresponds to the number of locked positions desired for the ball valve. Preferably there are two recesses 22 corresponding to two ball valve positions—fully open and fully closed. Alternatively, there may be recesses 22 for lock positions between fully open and fully closed, in order to more closely regulate the liquid flow through the ball valve. The shape and depth of the recesses 22 correspond to the shape and length of the lock pin 41, which extends into one of the recesses 22 when the assembly 10 is locked in place. The lock plate 21 further may have a tab channel 24 formed into the top surface 23 to receive the tab 18. The tab channel 24 is at least as deep as the tab 18 is long. The tab channel 24 is substantially arcuate about a point on the axis of the lock plate 21, such that the tab 18 may move through the tab channel 24 when the assembly 10 is rotated about the lock plate's 21 axis. The arc length of the tab channel 24 determines the range of rotation of the assembly 10, as the tab 18 arrests the rotation of the assembly 10 when it contacts either end of the tab channel 24. Preferably, the tab channel 24 allows 90 degrees of rotation of the assembly 10 about the lock plate's 21 axis, corresponding to the ball valve's fully open and fully closed positions. Likewise, the preferred recesses 22 are spaced 90 degrees apart.

In embodiments where the assembly 10 is an integrated component of the Y-valve, the lock plate 21 may be integral with the valve body 5. In the preferred embodiment, where the assembly 10 is configured to be retrofit onto an existing Y-valve, the lock plate 21 is a separate, washer-shaped component that slides over the valve column 6 and is disposed between the valve body 5 and the assembly 10. In this embodiment, the assembly 10 replaces the original non-locking handles on the Y-valve. The lock plate 21 may have a projection 25 that extends outward from the bottom surface 26 of the lock plate 21. The projection 25 serves to anchor the lock plate 21 to the valve body 5 so that it does not rotate as the assembly 10 is rotated. Preferably, the projection 25 is shaped to substantially fill a guide channel 7 in the valve body 5, the guide channel 7 having previously served to limit the rotation of the original handles in a manner similar to that of the tab channel 24. See FIGS. 1A and 2. When the lock plate 21 is in place, the projection 25 prevents motion of the lock plate 21 by abutting the sides of the guide channel 7.

The handle 11 extends proximally from the proximal end of the housing 12. To make it easy to lock the valve open and closed in emergency situations, particularly for firefighting, the handle 11 must be of a shape that is easy to grasp with a hand covered in a heavy glove. The handle 11 is preferably 3.5 to 4.5 inches long and between 1 and 2 inches in diameter. Preferably the handle 11 is made of aluminum or steel, and is knurled or has a cross-section with corners. The figures herein show a handle 11 with a hexagonal cross section, but square, octagon, or other shape may suffice. Rod handles 11 with T-grips on the end suffice as well. A cavity extends partially or fully though the handle 11 from the distal end, receiving the proximal end of the axle 32 of the locking mechanism 13. The handle 11 is attached to the axle 32, preferably by a long screw (not shown), so that when the handle 11 is rotated about its axis, which is coaxial with the axis of the axle 32, the axle 32 rotates as well. This rotation retracts and extends the lock pin 41 as described below.

Figure 8:
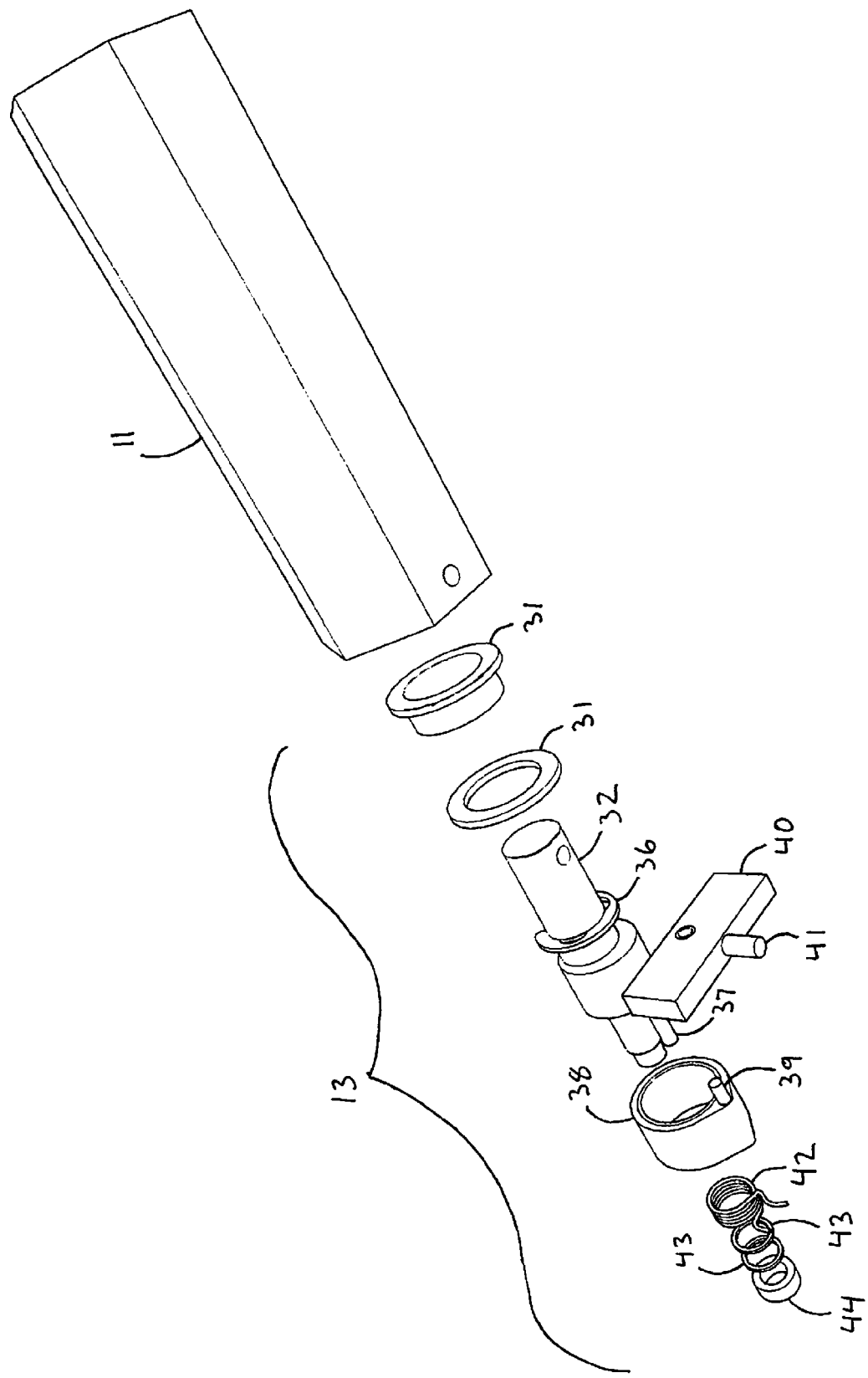
FIG. 8 is an exploded bottom perspective view of the preferred locking mechanism.
Figure 9:
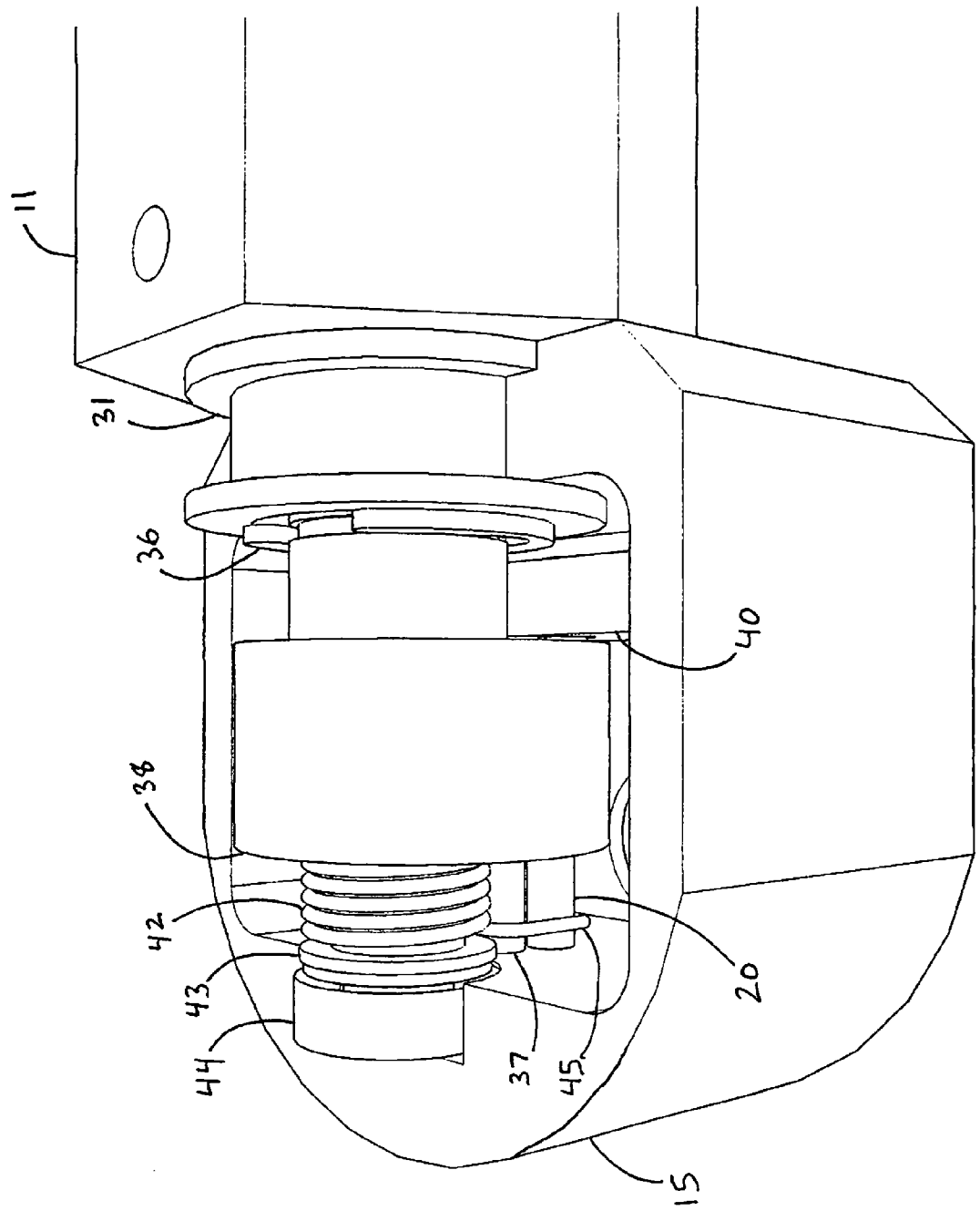
FIG. 9 is top right perspective view of the locking mechanism seated in the lower portion of the housing.

Various locking mechanisms 13 can be used to effect the locking and unlocking of the assembly 10. In general, the lock pin 41 may be retracted and extended using a trigger, button, lever, or other locking mechanism, but the preferred locking mechanism 13 is illustrated in FIGS. 7-9, in which the handle 11 is attached to and coaxial with the axle 32. The axle has an attachment section 33, a latching section 34, and a biasing section 35, each corresponding to parts that fit over the axle 32 to form the locking mechanism 13. The attachment section 33 passes out of the housing 12 through the axle aperture 26, into the cavity in the handle 11. An axle washer 36 may be attached to the axle 32 in the attachment section 33. The axle washer 36 is attached so that when it contacts the mounting washer 31, the attachment points of the handle 11 and axle 32 are aligned to allow a screw to pass through. This firmly affixes the axle 32 in place.

The latching section 34 is substantially cylindrical, but is wider than the attachment section 33 as shown. A latch post 37 extends distally from the distal surface 38 of the latching section 34. The latch post 37 is offset from the axis of the axle 32, is substantially parallel to the axis of the axle 32, and cooperates with the biasing post 20 and the spring 42 to apply tension to the handle 11 as described below. The latching section 34 receives a teardrop-shaped cam 38 having an inner radius substantially equal to the radius of the latching section 34, so that the cam 38 fits tightly on the latching section 34. From the elongated part of the cam 38, a cam post 39 extends proximally, passing through and vertically suspending a pin mount 40 positioned over the pin aperture 17. The pin mount 40 is free-floating with respect to the cam 38, such that it retains it orientation as it is raised when the cam 38 is rotated. The pin mount 40 is preferably a rectangular block of aluminum or steel having a length such that it nearly touches the wall of the housing 12 on both sides. The lock pin 41 may be integral with the pin mount 40, or may be permanently or removably attached to the point mount 40. The lock pin 41 extends down from the pin mount 40 through the pin aperture 17 and, when the assembly is in a locked position 10, the lock pin 41 extends into a recess 22 in the lock plate 21.

The biasing section 35 of the axle 32 has a smaller radius than the other sections 33, 34 and is coaxial with the attachment section 33. A spring 42 fits over the axle 32 in the biasing section 35, and is held in place against the distal surface 38 of the latching section 34 by one or more retention washers 43 and a cap 44. The spring 42 is a small compression spring with partially straightened ends that extend away from the spring 42 to form prongs 45. The prongs 45 have a length that allows them to contact both the latch post 37 and the biasing post 20 laterally as shown. The cap 44 fits into a recess in each portion 14, 15 of the housing 12, stabilizing the locking mechanism 12 and allowing the axle 32 to rotate about its main axis, with which the attachment section 33, biasing section 35, axle washer 36, cam 38, spring 42, and cap 44 are coaxial.

Figure 10:
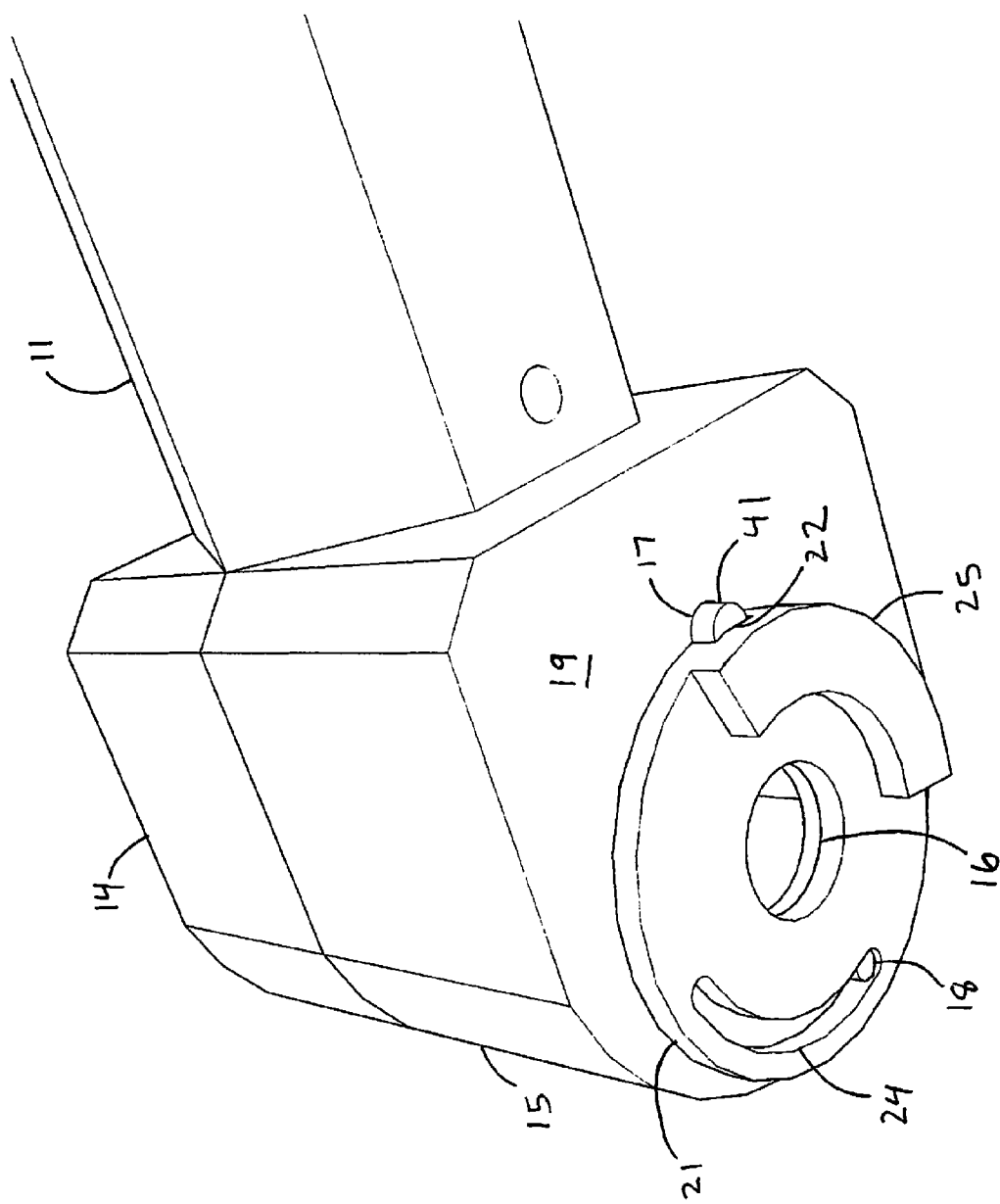
FIG. 10 is a bottom perspective view of the lock pin engaged in a recess of the lock plate.

In the preferred embodiment, the handle 11 can be rotated about its lengthwise axis in a clockwise or counterclockwise direction, so that no time is spent trying to figure out which way to turn the handle 11 to raise the lock pin 41. Further, preferably the handle and latch system are designed to be sturdy enough to survive adrenaline-charged, strong hands and arms turning valves on and off. From a locked position, in which the lock pin 41 is extended into a recess 22 as shown in FIG. 10, the handle 11 is rotated about its axis, causing the axle 32 to rotate. Consequently, the cam 38 rotates, pulling the pin mount 40 upward and retracting the lock pin 41. Simultaneously, the latch post 37 engages a prong 45 of the spring 42 and rotates the prong 45. This causes the other prong 45 to engage the biasing post 20. The biasing post 20 arrests the movement of this prong 45, and the force pulling the prongs 45 apart compresses the spring 42. The resistance of the two prongs 45 puts the handle 11 rotation under tension. The handle 11 is limited in its rotation by one or more of the maximum compression of the spring 42, or the contact of the pin mount 40 against the axle 32 as it rises. This prevents over-twisting of the handle 11 so that the lock pin 41 cannot become disengaged from the pin aperture 17. When the lock pin 41 is sufficiently retracted, the handle 11 is rotated about the axis of the valve column 6 to its next position, again prevented from over-rotation by the cooperating tab 18 and tab channel 24. At its next position, the handle 11 is released. The decompression of the spring 42 forces the lock pin 41 to extend into the next recess 22, securely locking the assembly 10 into place. The preferred assembly 10 is resistant to lock disengagement by accidental bumping or rough treatment due to the lock pin 41 and handle 11 remaining under tension by the spring 42.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of this disclosure.

We claim:

1. A device for enabling a valve to be locked in a plurality of positions, the device comprising:
   a. a housing connected to the valve;
   b. a locking mechanism substantially enclosed within the housing and comprising a lock pin configured to lock the valve in each position;
   c. a lock plate disposed between the housing and the valve, the lock plate comprising at least one recess, wherein the lock pin extends into the recess when the valve is locked in a position; and
   d. a handle attached to the locking mechanism such that the handle retracts the lock pin from the recess when the handle is rotated about its lengthwise axis.

2. The device of claim 1 wherein the locking mechanism further comprises a spring configured to be compressed when the handle is rotated about its axis, such that the spring decompresses to extend the lock pin when the handle is released.

3. The device of claim 1 wherein the housing is attached to a valve column configured to open and close the valve by rotating about the valve column's axis, the housing being attached to the valve column such that the housing and handle may be rotated about the valve column's axis when the lock pin is not extended into the recess.

4. The device of claim 3 wherein the housing comprises:
   a. a wall having a proximal end, a distal end, and two sides;
   b. a top attached to the wall;
   c. a bottom attached to the wall;
   d. a valve column aperture disposed through the bottom and configured to receive the valve column; and
   e. a pin aperture disposed through the bottom and aligned with the lock pin to allow the lock pin to extend out of the housing into the recess.

5. The device of claim 4 wherein the housing further comprises a tab extending downward from the bottom of the housing, and wherein the lock plate further comprises a tab channel configured to receive the tab and limit the range of rotation of the housing about the valve column's axis.

6. The device of claim 5 wherein the lock plate further comprises a projection configured to extend into a guide channel on an existing Y-valve, the projection anchoring the lock plate against rotation about the valve column's axis.

7. The device of claim 5 further comprising a valve body with which the lock plate is integral, the valve body containing the valve within a branch through which fluid flows.

8. The device of claim 5 wherein the handle is configured to be rotated to retract the lock pin from the recess.

9. The device of claim 8 wherein the locking mechanism further comprises an axle having a proximal end and a distal end, the axle being attached to the handle at the proximal end; and wherein the handle and axle rotate about the axis of the axle to retract the lock pin from the recess.

10. The device of claim 9 wherein the handle is coaxial with the axle.

11. The device of claim 10 wherein the locking mechanism further comprises:
    a. a teardrop-shaped cam attached to the axle such that the cam rotates coaxially with the axle; and
    b. a pin mount attached to the lock pin and attached to the cam such that the pin mount and lock pin are raised but retain their respective orientations as the cam rotates.

12. The device of claim 11 wherein the locking mechanism further comprises a spring configured to be compressed when the handle is rotated about its axis, such that the spring decompresses to extend the lock pin when the handle is released.

13. The device of claim 12 wherein:
   a. the housing further comprises a biasing post attached to the wall at the distal end and extending proximally into the housing;
   b. the locking mechanism further comprises a latch post attached to the axle, the latch post having an axis that is offset from and substantially parallel to the axis of the axle, the latch post extending distally such that it is substantially vertically aligned above the biasing post;
   c. the spring is disposed on the axle and vertically aligned above the biasing post and the latch post; and
   d. the spring comprises a first prong and a second prong, each prong having a length that is sufficient to substantially contact the biasing post, such that the spring is compressed by the first prong contacting the latch post and the second prong contacting the biasing post as the axle is rotated.

14. The device of claim 1 wherein the lock plate further comprises a projection configured to extend into a guide channel on an existing Y-valve, the projection anchoring the lock plate against rotation about the lock plate's axis.

15. A device for enabling locking of a valve controlled by a valve column, the device comprising:
   a. a housing connected to the valve column so that the housing and valve column rotate about the valve column's axis, the housing comprising:
      i. an upper portion having proximal and distal ends;
      ii. a lower portion attached to the upper portion, the lower portion having proximal and distal ends, a wall, and a bottom;
      iii. an axle aperture formed through the proximal ends of the upper portion and lower portion;
      iv. a biasing post attached to the wall of the lower portion at the distal end, the biasing post extending proximally into the housing;
      v. a valve column aperture formed through the bottom of the lower portion and sized to receive the valve column;
      vi. a pin aperture formed through the bottom of the lower portion; and
      vii. a tab extending from the bottom of the lower portion downward out of the housing;
   b. a circular lock plate disposed coaxially with the valve column, the lock plate comprising:
      i. an arcuate tab channel having an angular length of about 90 degrees and being configured to receive the tab such that the tab arrests rotation of the housing and valve column when it contacts either end of the tab channel;
      ii. a first recess formed into the lock plate; and
      iii. a second recess formed into the lock plate at a 90 degree angular distance from the first recess;
   c. a locking mechanism substantially enclosed within the housing, the locking mechanism comprising:
      i. an axle having a proximal end and a distal end, the proximal end extending out of the axle aperture;
      ii. a latch post connected to the axle, the latch post having an axis that is offset from and substantially parallel to the axis of the axle, the latch post extending distally such that it is substantially vertically aligned above the biasing post;
      iii. a teardrop-shaped cam encircling a portion of the axle proximally from the latch post, the teardrop-shaped cam being substantially coaxial with the axle and comprising a cam post extending proximally from the cam and substantially parallel to the axle;
      iv. a pin mount attached to the cam post, the pin mount comprising a lock pin aligned with the pin aperture such that the lock pin extends through the pin aperture and into the first recess or second recess when the device is in a locked position; and
      v. a spring retained on the axle and encircling a portion of the axle distally from the cam and above the biasing post, the spring comprising a first prong and a second prong, each prong having a length that is sufficient to substantially contact the biasing post; and
   d. a handle attached to the proximal end of the axle such that, when the device is in a locked position, the handle may be rotated about the axis of the axle, causing the cam to rotate and raise the pin mount, retracting the lock pin from the first recess or second recess, and further causing the latch post to rotate such that the latch post contacts the first prong and the biasing post contacts the second prong, compressing the spring and placing the handle rotation under tension so that the lock pin extends back into the first recess or second recess when the handle is released.

16. The device of claim 15 wherein the lock plate further comprises a projection configured to extend into a guide channel on an existing Y-valve, the projection anchoring the lock plate against rotation about the valve column's axis.

17. The device of claim 15 further comprising a valve body with which the lock plate is integral, the valve body containing the valve within a branch through which fluid flows.

* * * * *